United States Patent [19]
McGregor et al.

[11] Patent Number: 6,100,474
[45] Date of Patent: Aug. 8, 2000

[54] MAGNET WIRE INSULATION FOR INVERTER DUTY MOTORS

[75] Inventors: Charles W. McGregor; Joseph J. Harber; James J. Connell; Ronald J. Beeckman, all of Fort Wayne, Ind.

[73] Assignee: Essex Group, Inc., Fort Wayne, Ind.

[21] Appl. No.: 08/880,987

[22] Filed: Jun. 23, 1997

[51] Int. Cl.$^7$ ................................................... H01B 7/00
[52] U.S. Cl. ................................. 174/110 R; 174/120 R
[58] Field of Search ........................... 174/110 R, 110 A, 174/110 SR, 110 N, 120 R, 120 SR, 127; 428/372, 375, 383, 384, 389

[56] References Cited

U.S. PATENT DOCUMENTS

| | | | |
|---|---|---|---|
| 3,671,480 | 6/1972 | Wada et al. | 523/307 |
| 4,476,192 | 10/1984 | Imai et al. | 174/110 S |
| 4,503,124 | 3/1985 | Keane et al. | 174/110 N X |
| 4,521,549 | 6/1985 | Penneck | 174/110 S |
| 4,760,296 | 7/1988 | Johnston et al. | 174/127 X |
| 4,980,086 | 12/1990 | Hiraiwa et al. | 252/511 |
| 5,061,554 | 10/1991 | Hjortsberg et al. | 428/220 |
| 5,654,095 | 8/1997 | Yin et al. | 174/110 R X |
| 5,668,205 | 9/1997 | Yoshida et al. | 524/268 |

*Primary Examiner*—Dean A. Reichard
*Assistant Examiner*—Chau N. Nguyen
*Attorney, Agent, or Firm*—Rader, Fishman & Grauer PLLC

[57] ABSTRACT

A magnet wire insulation designed to withstand voltage wave shapes present in inverter driven motors for a sustained period of time. A large surface area inorganic oxide, e.g., fumed silica, may be added into the magnet wire insulation for providing improved resistance to insulation degradation. Alternatively, a mixture of the large surface area inorganic oxide with a low resistivity oxide, e.g., chromium oxide, provides a greater improvement in resistance to insulation degradation. The present invention is particularly useful for extending the life of windings in a motor that is subjected to high voltage, steep wave shapes such as those found in inverter driven motors.

6 Claims, 1 Drawing Sheet

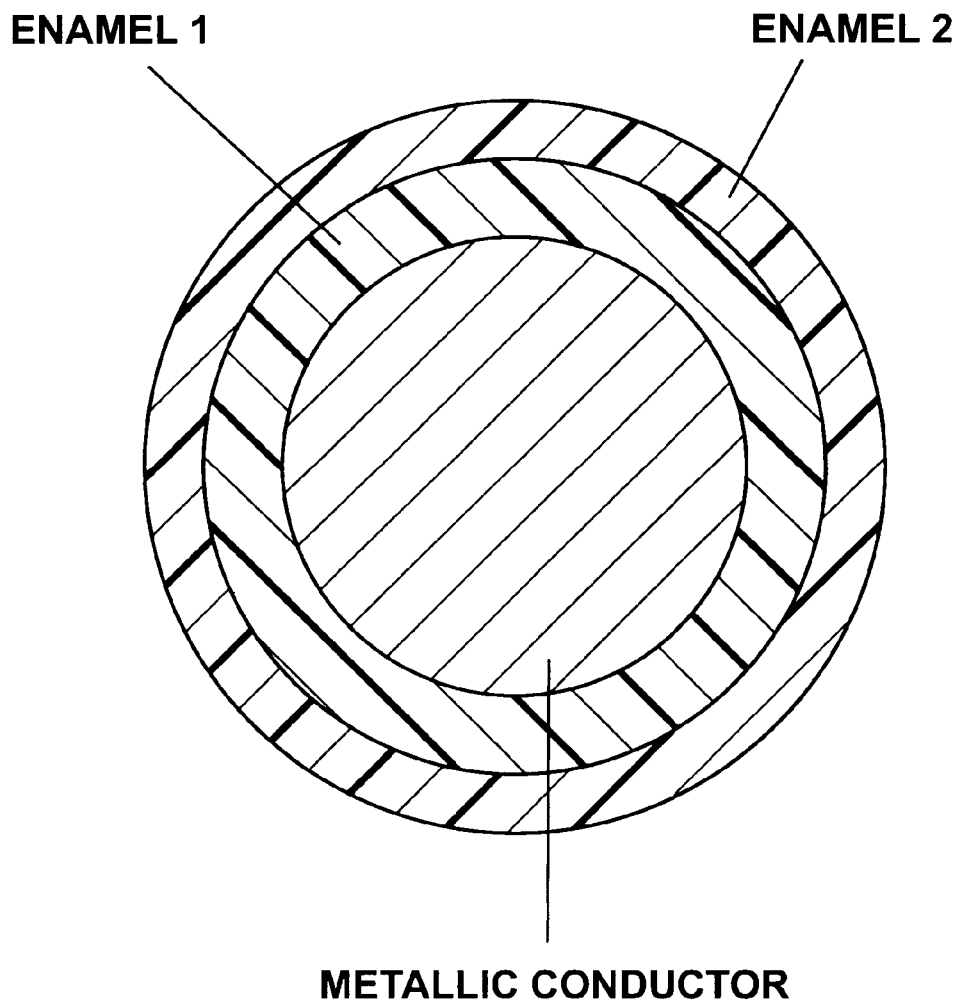

MAGNET WIRE INSULATION FOR INVERTER DUTY MOTORS

BACKGROUND OF THE INVENTION

The present invention relates to magnet wire insulation designed to withstand voltages present in inverter driven motors for a sustained period of time. More specifically, the present invention relates to magnet wire insulation that is intended to improve the life of motor windings when used in conjunction with an inverter drive, e.g., pulse-width modulated variable frequency drive.

Inverter drives and inverter driven motors have received increased attention because of continuing needs for greater energy efficiency. It has been estimated that three-phase induction motors consume 60–70% of the electrical energy used in the United States. These motors obviously waste substantial energy when run at full speed when conditions do not require it.

An adjustable speed drive (ASD) allows a motor to operate at variable speed by providing variable frequency to the motor. Electronic ASDs convert the incoming line voltage at 60 Hz to direct current (DC). The inverter then generates variable frequencies as input to the motor. These variable frequencies, however, can exhibit steep wave shapes that have been linked to premature motor winding failures in 440+voltage motors. The mode of failure in these motor windings has been linked to the degradation of the wire insulation caused by the high voltage and higher frequency wave shapes.

Various attempts have been made to reduce premature failures as a result of degradation of the wire insulation. These attempts have included minimizing damage to the wire and insulation during handling and manufacture of the motors, and using shorter lead lengths from the inverter to the motor where appropriate. Further, a reactor coil or a filter between the inverter and the motor can extend the life of the windings by reducing the voltage spikes and high frequencies generated by the inverter cable/motor combination. However, such coils are expensive and add to the overall cost of the system. Increasing the amount of insulation from standard heavy build magnet wire can improve the life of the windings in the motor, but this option is both expensive and decreases the amount of space for the copper in the motor, thereby producing a less efficient motor. Another option includes increasing the amount of varnish in the motor windings, however, this strategy is ineffective if the windings are not completely covered.

Therefore, there is a need for a magnet wire insulation that is designed to withstand voltages which are present in inverter driven motors for longer periods of time as compared to the present constructions.

SUMMARY OF THE INVENTION

The disclosed invention improves the resistance to the voltages present in the windings of inverter driven motors without the drawbacks from the prior strategies for reducing premature failures. The invention consists of either adding high surface area silica or a mixture of silica and chromium oxide into the magnet wire insulation. Thus, the disclosed insulation comprises one or more layers of a cured, wire enamel type polymer with high surface area silica or a mixture of silica and chromium oxide dispersed in one or more of the polymeric layers.

The invention extends the life of the windings in a motor used in an inverter application. In practicing the invention, a copper conductor is overcoated with a polyester base coat and a polyamide-imide topcoat. High surface area silica or a blend of the silica and chromium oxide is added to the polyamide-imide topcoat. The invention, however, is not limited to two-layer enamels used in magnet wires.

While the prior art shows the addition of inorganic oxides or organo-metallic compounds to magnet wire enamels, the life of motor windings used in inverter drives and inverter drive motors is improved when high surface area, i.e., fumed silica, is dispersed either alone or in a mixture with chromium oxide into the insulation. The present invention provides an inorganic oxide, namely fumed silica, that has a large surface area for permitting more energy dissipation in the insulation. This improves the life of motor windings that are subjected to the high voltages present in inverter driven motors. Moreover, a mixture of fumed silica and a low resistivity oxide, namely chromium oxide, provides additional improvement to the life of motor windings. It is intended that the larger surface area provided by fumed silica will permit more energy dissipation in the insulation and the low resistivity oxide will spread the electrical charge over the surface of the insulation. It has been discovered that the mixture of fumed silica and chromium oxide provides a better result than using either the fumed silica or chromium oxide alone.

It was intended that one of the inorganic oxide additives have a large surface area for permitting more energy to dissipate in the insulation. Silica is the only inorganic oxide commercially available in grades having different particulate surface areas. Available specific surface areas for silica range from approximately 90 to 550 $m^2/g$. Since it was found that resistance to insulation failure in an inverter drive motor improves with increasing silica surface area, the preferred silica grade for the present invention has a specific surface area between about 380 and 550 $m^2/g$. The preferred range of silica in the insulation is between 10 and 50% based upon weight. Substantial improvement is not observed at silica levels below 10%, and insulation flexibility is lost at silica levels greater than 50%. Further, to ensure a smooth, continuous surface, the silica is milled to break up any agglomerates. The silica may be milled directly into the wire enamel in the presence of solvent, or the silica can be milled in solvent and then added to the enamel. In either case, milling breaks up the agglomerates and the solvent keeps the particles from re-agglomerating. Once the silica has been dispersed in the polymer, the polymer is applied to a conductor in a conventional fashion. For magnet wire, the uncured insulation is applied by using multi-pass coating and wiping dies followed by curing at elevated temperature.

As set forth previously, even better results in extending the life of the windings in a motor is achieved by adding a mixture of inorganic oxides, namely silica and chromium oxide, into the magnet wire insulation. A dispersion of silica and chromium oxide is added to a polyamide-imide wire enamel whereby the concentration of the total oxide is in the range of 5–50% based on the total polymer content. The resulting magnet wire enamels may then be coated on a wire using convention techniques.

BRIEF DESCRIPTION OF THE DRAWING

The drawing is a cross-sectional view of a conductor insulated with a two-layer insulation made in accordance with the present invention.

DETAILED DESCRIPTION OF THE PREFERRED EMBODIMENTS

The present invention consists of adding an inorganic oxide having a large surface area into one or more layers of a magnet wire insulation. Alternatively, the large surface area inorganic oxide is mixed with a low resistivity inorganic oxide, and the mixture is added into one or more layers of the magnet wire insulation.

Referring to the drawing, the invention will hereinafter be described in connection with the combination of a metallic conductor that is overcoated with a polyester base coat (Enamel 1) and a polyamide-imide topcoat (Enamel 2). While NEMA 1000, MW35-C type magnet wire enamels typically consist of a polyamide-imide topcoat and polyester base coat, the present invention may be used with other thermosetting or thermoplastic polymers.

The present invention will be described initially with respect to the addition of only a large surface area inorganic oxide, namely fumed silica, into the magnet wire insulation. A large surface area inorganic oxide was selected because it is believed that the larger surface area permits more energy to penetrate through the insulation thereby reducing the degradation of the insulation caused by high voltage and high frequency wave shapes in inverter drive motors. Silica is commercially available in grades having specific surface areas ranging from approximately 90 to 550 $m^2/g$. For example, "AEROSILL 90", available from Degussa, has a specific surface area of 90 $m^2/g$, and "EH-5", available from Cabot, has a specific surface area of 380 $m^2/g$. It has been discovered that the resistance to the voltage wave shapes present in the windings of inverter driven motors is improved with increasing silica surface area. Thus, silica grades having specific surface areas between 380 and 550 $m^2/g$ are preferred.

The silica used in the present invention has a nominal particle size less than one micron. Further, it is preferable to use fumed silica (manufacture by gas phase hydrolysis of the corresponding halide). Moreover, the preferred range of silica in a single layer of insulation is between 10 and 50% based on weight. Substantial improvement in life with inverter driven motors is not observed at silica levels below 10% and insulation flexibility is unacceptable at silica levels greater than 50%. The silica may be added to one, some or all of the insulation layers.

The fumed silica is added to the polymer insulation by milling to ensure a smooth, continuous enamel surface. In one method, the silica is milled directly into the wire enamel in the presence of a solvent. Alternatively, the silica is milled in solvent and then added to the enamel. In either case, milling breaks up the agglomerates and the solvent keeps the particles from re-agglomerating. Finally, it is preferred that the silica be milled to a Hegman grind of "seven" or finer, which corresponds to an approximately particle size of 12.7 microns.

Once the silica has been dispersed in the polymer, the polymer is applied to a conductor in a conventional fashion. For magnet wire, the uncured insulation is applied using multi-pass coating and wiping dies followed by curing at an elevated temperature. For a polyester base coat and polyamide-imide topcoat magnet wire, the curing temperature may range between 230° C. and 600° C., depending on the wire speed. Wire speeds may vary from 2 to 1600 ft/min or more, depending on the type of conductor that is coated. The buildup of the enamel on the wire can range between 0.2 and 10 mils.

An example which shows the improvement in the resistance to the voltages present in inverter driven motor windings will now be described. Magnet wires having a polyester base coat Enamel 1 in a polyamide-imide topcoat Enamel 2 were prepared by Essex Group, Inc. Two grades of fumed silica were used: "low" surface area silica, having a specific surface area of 90 $m^2/g$ and "high" surface area silica having a specific surface area of 380 $m^2/g$. In this example, fumed silica was added to the polyamide-imide enamel only and comprised about 15% of the polyamide-imide layer by weight.

The wire enamels were applied to an 18 AWG copper wire using multi-pass coating and wiping dies. Table I sets forth the influence of the fumed silica and specific surface area on the resistance of the magnet wire insulation to degradation. References in Table I to "single", "heavy", "triple" and "quadruple" correspond to the nominal insulation thickness of 1.7, 3.0, 4.3 and 6.4 mils, respectively. In all cases, the polyester base coat enamel thickness was maintained at about 1.8 mils.

Various magnet wires were tested at Essex's Magnet Wire Testing Laboratory using an inverter drive and motor. Typical twisted pairs were made from the wire and placed in an oven at 200° C. High voltage, high frequency wave forms from an inverter drive set-up were then sent to the twisted pairs. The twisted pairs were monitored until a short circuit occurred and the time to short circuit was then recorded. The longer the time to short circuit (failure), the better the resistance to insulation degradation. The time to failure for the various magnet wire enamel formulations and thicknesses are set forth in Table I.

As expected, increasing the wire insulation thickness improves the resistance to insulation degradation. For example, quadrupling the enamel thickness resulted in an increase in time to failure of 600–1000 times. More significant, however, was the fact that a greater improvement in degradation resistance is achieved by adding a "high" surface area fumed silica to the "heavy" insulation. Indeed, the time to failure for the "heavy" enamel thickness improved about 44 times (309 hours versus 7 hours). Moreover, magnet wire with an enamel containing "high" surface area silica showed nearly a six-fold improvement in time to failure when compared to magnet wire insulated with an enamel containing a "low" surface area silica (309 hours versus 52 hours).

TABLE I

Influence of Fumed Silica and Specific Surface Area on Resistance of Magnet Wire Insulation to Degradation

| Insulation Thickness | Low Surface Area Silica | High Surface Area Silica | Time to Failure, Hours |
| --- | --- | --- | --- |
| Single | — | — | .02–0.4 |
| Heavy | — | — | 7 |
| Triple | — | — | 19 |
| Quadruple | — | — | 250 |
| Heavy | — | X | 309 |
| Heavy | X | — | 52 |

The present invention also consists of adding a mixture of large surface area and low resistivity oxides, namely fumed silica and chromium oxide, into the magnet wire insulation. The following example shows the improvement in degradation resistance when a mixture of silica and chromium oxide was added into the insulation. A dispersion was prepared using a 50:50 ratio of silica to chromium oxide ($Cr_2O_3$). The dispersion was then added to a polyamide-imide (AI) wire enamel where the concentration of the total oxide was 15% based on the total polymer content. Dispersions were also made where silica and chromium oxide ($Cr_2O_3$) were used alone, and these dispersions were also incorporated into a polyamide-imide (AI) enamel at the same oxide level. The resulting magnet wire enamels were then coated on 18 AWG wire in a test oven to comply with NEMA 1000 MW35-C specifications. The final insulated wire build consisted of approximately 60% polyester and 40% polyamide-imide topcoat. Typical dielectric twisted pairs (five each) were made from the wire and wave shapes from a 460 volt inverter cable/motor set up were sent to the twisted pairs. The twisted pairs were monitored until they shorted out, signifying a failure. The times were recorded from the beginning of the test to each short, and the hours to failure were recorded. An average four each wire construction was determined. The following Table II shows the results of the test:

TABLE II

| Wire Construction | Percent Topcoat | Average Hours to Failure |
|---|---|---|
| Standard Essex MW35-C | 20% | 0.8 |
| 15% Silica in the AI topcoat | 40% | 17.6 |
| 15% $Cr_2O_3$ in the AI topcoat | 40% | 4.9 |
| 7.5% Silica + 7.5% $Cr_2O_3$ in the AI topcoat | 40% | 245.0 |
| 7.5% Silica + 7.5% $Cr_2O_3$ in the AI topcoat | 20% | 172.0 |

Preferred embodiments of the present invention have been disclosed. A person of ordinary skill in the art will realize, however, that certain modifications come within the teachings of this invention.

What is claimed is:

1. An insulation for an electrical conductor comprising:
   at least one layer of a polymer disposed around said electrical conductor;
   a mixture of fumed silica and chromium dioxide dispersed in said polymer layer; and
   wherein said mixture of fumed silica and chromium dioxide provides resistance to degradation of the insulation as a result of high voltage and high frequency wave forms passing through the electrical conductor.

2. An insulation for an electrical conductor as set forth in claim 1 wherein the fumed silica has a particle size in a range from about 250 $m^2/g$ to about 550 $m^2/g$.

3. An insulation for an electrical conductor as set forth in claim 2 wherein the particle size of the fumed silica is in the range from about 380 $m^2/g$ to about 550 $m^2/g$.

4. An insulation for an electrical conductor comprising:
   a polyester insulating layer surrounding said electrical conductor;
   a polyamide-imide insulating layer surrounding said polyester layer;
   wherein at least one of said insulating layers includes a mixture of fumed silica and chromium dioxide dispersed therein; and
   wherein said mixture of fumed silica and chromium dioxide provides resistance to degradation of the insulation as a result of high voltage and high frequency wave forms passing through the electrical conductor.

5. An insulation for an electrical conductor as set forth in claim 4 wherein said fumed silica has a particle size in a range from about 250 $m^2/g$ to about 550 $m^2/g$.

6. An insulation for an electrical conductor as set forth in claim 5 wherein the particle size of the fumed silica is in the range from about 380 $m^2/g$ to about 550 $m^2/g$.

* * * * *

UNITED STATES PATENT AND TRADEMARK OFFICE
CERTIFICATE OF CORRECTION

PATENT NO : 6,100,474
DATED : August 8, 2000
INVENTOR(S) : Charles W. McGregor et al.

It is certified that error appears in the above-identified patent and that said Letters Patent are hereby corrected as shown below:

Col. 5, line 31
  replace "dioxide"
  with --oxide--.
Col. 6, line 2
  replace "dioxide"
  with --oxide--.
Col. 6, line 17
  replace "dioxide"
  with --oxide--.
Col. 6, line 20
  replace "dioxide"
  with --oxide--.

Signed and Sealed this

Seventeenth Day of April, 2001

Attest:

NICHOLAS P. GODICI

Attesting Officer    Acting Director of the United States Patent and Trademark Office